US012325021B2

(12) United States Patent
Miller et al.

(10) Patent No.: US 12,325,021 B2
(45) Date of Patent: Jun. 10, 2025

(54) MICROFLUIDIC DEVICE

(71) Applicant: UFRACTION8 LIMITED, Falkirk (GB)

(72) Inventors: Brian Maxdell Miller, Falkirk (GB); Monika Jagoda Tomecka, Falkirk (GB)

(73) Assignee: UFRACTION8 LIMITED, Falkirk (GB)

(*) Notice: Subject to any disclaimer, the term of this patent is extended or adjusted under 35 U.S.C. 154(b) by 898 days.

(21) Appl. No.: 17/311,470

(22) PCT Filed: Dec. 20, 2019

(86) PCT No.: PCT/GB2019/053643
§ 371 (c)(1),
(2) Date: Jun. 7, 2021

(87) PCT Pub. No.: WO2020/128497
PCT Pub. Date: Jun. 25, 2020

(65) Prior Publication Data
US 2022/0023863 A1 Jan. 27, 2022

(30) Foreign Application Priority Data
Dec. 21, 2018 (GB) ..................................... 1820944

(51) Int. Cl.
*B01L 3/00* (2006.01)

(52) U.S. Cl.
CPC . *B01L 3/502753* (2013.01); *B01L 2300/0864* (2013.01); *B01L 2300/0883* (2013.01)

(58) Field of Classification Search
None
See application file for complete search history.

(56) References Cited

U.S. PATENT DOCUMENTS 8,226,332 B2 * 7/2012 Kojima .................... B03D 3/00 406/197
2009/0066936 A1 * 3/2009 Huang ............... G01N 15/1404 356/336

(Continued)

FOREIGN PATENT DOCUMENTS

WO 2017/179064 A1 10/2017

OTHER PUBLICATIONS

International Search Report for PCT/GB2019/053643, dated Mar. 17, 2020.

(Continued)

*Primary Examiner* — Lore R Jarrett
(74) *Attorney, Agent, or Firm* — Barnes & Thornburg LLP

(57) ABSTRACT

Microfluidic devices are provided for separating particulates that have a major dimension above a predetermined threshold value from a fluid, the device comprising an inlet, an inlet channel, a curved channel, a separation chamber, a first outlet and a second outlet; the inlet being connected to the inlet channel, the inlet channel is connected to the curved channel, the curved channel is connected to the separation chamber and the separation chamber is connected to the first outlet by a first outlet channel, and the separation chamber is connected to the second outlet by a second outlet channel; the first outlet channel comprises a serpentine portion; wherein the second outlet channel branches from the separation chamber substantially perpendicular to the first outlet channel.

14 Claims, 5 Drawing Sheets

(56) References Cited

U.S. PATENT DOCUMENTS

| | | | | |
|---|---|---|---|---|
| 2011/0084033 | A1 | 4/2011 | Rodriguez-Villarreal | |
| 2018/0185845 | A1 | 7/2018 | Bridle | |
| 2018/0207637 | A1 * | 7/2018 | Tripathi | B01D 21/26 |

OTHER PUBLICATIONS

Tripathi, S., et al., "Microdevice for plasma separation from whole human blood using bio-physical and geometrical effects", Scientific Reports, (Jun. 9, 2016), vol. 6, No. 1, pp. 1-15.

Russom, A., et al., "Differential inertial focusing of particles in curved low-aspect-ratio microchannels", New Journal of Physics, Institute of Physics Publishing, Bristol, Great Britain, (Jul. 31, 2009), vol. 11, No. 7, pp. 1-9.

Miller, B., et al., "Cascading and parallelising curvilinear inertial focusing systems for high volume, wide size distribution, separation and concentration of particles", Scientific Reports, (Nov. 3, 2016), vol. 6, No. 1, pp. 1-8.

* cited by examiner

MICROFLUIDIC DEVICE

CROSS REFERENCE TO RELATED APPLICATIONS

This application is a National Stage application of International Application No. PCT/GB2019/053643 filed Dec. 20, 2019, which claims priority under 35 U.S.C. § 119 to GB Patent Application No. 1820944.5, filed Dec. 21, 2018, the contents of which are hereby incorporated by reference.

FIELD OF THE INVENTION

The application relates to the field of microfluidic devices, more specifically to microfluidic devices for concentrating and/or filtering fluid samples containing particulates.

BACKGROUND OF THE INVENTION

There are many applications where particulates are required to be separated from or detected in a liquid medium. For example, it is important to be able to detect and potentially remove particulates from water to allow water quality monitoring and treatment, or to allow the efficient removal or purification of cells within a medium, such as culture medium, or a bodily fluid such as blood.

The processing of liquid to remove or to detect particulate contaminants is of especial importance for detecting and/or removing water borne pathogens, such as *Cryptosporidium* or Giardia, for example, in and/or from water supplies. Other examples include the separation of cells from a medium, such as cell culture or a bodily fluid such as blood, for example.

Microfluidic devices are used to process small volumes of liquid (between 15 μl/min and 5 ml/min) (see Nugen, S. R., et al., PMMA biosensor for nucleic acids with integrated mixer and electrochemical detection. Biosensors and Bioelectronics, 2009. 24(8): p. 2428-2433, and Xu, S. and R. Mutharasan, Detection of *Cryptosporidium parvum* in buffer and in complex matrix using PEMC sensors at 5 oocysts $mL^{-1}$. Analytica Chimica Acta. 669(1-2): p. 81-86, for example), and typically comprise a detector, such as a biosensor, for example. Accordingly, such devices are able to successfully detect very small concentrations of particulates or other contaminants. However, detection of biological species, for example, require small concentrated samples, and therefore, the use of biosensor devices and other detection devices for environmental monitoring are often limited by the low volumetric throughput and the time required to process a statistically relevant sample of treated water being too long for real world application.

Where bodily fluids such as blood are to be processed, low volume devices have been demonstrated to be successful at providing a pure blood plasma sample from a pure blood sample (Tripathi, S et al. Microdevice for plasma separation from whole human blood using bio-physical and geometrical effects. Sci. Rep. 6, 26749, 2016). However, the low volumes within which these devices have been demonstrated to be operable limits their application.

Highly parallelised arrays of microfluidic devices (see for example Di Carlo, D., et al., Equilibrium Separation and Filtration of Particles Using Differential Inertial Focusing. Analytical Chemistry, 2008. 80(6): p. 2204-2211, Beech, J. P., P. Jonsson, and J. O. Tegenfeldt, Tipping the balance of deterministic lateral displacement devices using dielectrophoresis. Lab on a Chip, 2009. 9(18): p. 2698-2706, and Holm, S. H., et al., Separation of parasites from human blood using deterministic lateral displacement. Lab on a Chip) allow a higher volume of liquid to be processed in a given timescale, or to carry out pre-processing of samples to concentrate and/or enrich samples to be tested. However, such arrays typically greatly increase the footprint and cost of the device, which in turn limits the applicability of such devices.

Therefore, there remains a need for a device that allows a high throughput of liquid to be processed in a realistic timescale that is cost effective and has a small footprint.

Typically, devices employ a form of filtration of the liquid to be processed to allow the particulates to be detected or collected for analysis. However, over time, especially in cases where the volume of liquid to be processed is high, the filters used typically become clogged or blocked with particulates and must be replaced before further volumes of liquid can be processed.

Accordingly, it is an object of the present invention to provide an improved device for processing of large volumes of fluid.

SUMMARY OF THE INVENTION

According to a first aspect there is provided a microfluidic device for separating particulates that have a major dimension above a predetermined threshold value from a fluid, the device comprising an inlet, an inlet channel, a curved channel, a separation chamber, a first outlet and a second outlet; the inlet being connected to the inlet channel, the inlet channel is connected to the curved channel, the curved channel is connected to the separation chamber and the separation chamber is connected to the first outlet by a first outlet channel, and the separation chamber is connected to the second outlet by a second outlet channel; the first outlet channel comprises a serpentine portion; wherein the second outlet channel branches from the separation chamber substantially perpendicular to the first outlet channel; the curved channel having an angle of curvature of 150 to 270 degrees; wherein the aspect ratio of the inlet channel is from 10 to 20, the aspect ratio of the curved channel is from 5 to 10, the aspect ratio of first outlet channel is from 1.5 to 6, and the aspect ratio of the second outlet channel is from 15 to 25 such that, during use, fluid flows from the inlet, to the first outlet and the second outlet via the inlet channel, the curved channel, the separation chamber and the first outlet channel and the second outlet channel respectively; wherein particulates within the fluid at the inlet that have a major dimension above the predetermined threshold value are substantially focused into the second outlet and the fluid that is collected at the first outlet is substantially free of particulates that have a major dimension above the predetermined threshold value.

It has been surprisingly found a microfluidic system according to the present aspect can successfully focus particulates that have a major dimension greater in length than a predetermined threshold value to the same or greater extent as equivalent systems but with a greater through put. Not wishing to be bound by theory it is suggested that the provision of an inlet channel having an aspect ratio from 10 to 20, and/or a curved channel having an aspect ratio of from 5 to 10, and/or a first outlet channel having aspect ratio of from 1.5 to 6, and/or a second outlet channel having an aspect ratio of from 15 to 25 allows a greater volume of fluid to be processed by the device whilst still maintaining the same or substantially the same efficacy and the same threshold value for filtered particulates.

Conventional teaching in the art (for example, Zhou et al. Fundamentals of inertial focusing in microchannels, Lab on a Chip, doi: 10.1039/c21241248a) would suggest that altering the aspect ratio of one or more of the channels of a microfluidic device would significantly affect the efficacy of the device and would fundamentally alter the filtering capability of the device.

However, the inventors have found that the device of the present aspect having increased the width of the channels without changing the height or depth of the channels provides the same filtering capability whilst improving the volume of fluid that can be processed in a given time period.

The inlet channel may have a first end adjacent to the inlet and a second end adjacent to the curved channel. In some embodiments the inlet channel comprises a linear portion. The linear portion may be at the second end of the inlet channel that is connected to the curved channel.

The width of inlet channel may be from 1.5 to 3 times greater than width of the curved channel. Accordingly, there may be a discontinuity between the inlet channel and the curved channel.

The predetermined threshold value is typically determined by dimensions of the channels of the device, the flow rate of fluid flowing through the device, the degree of curvature of the curved channel and the relative dimensions of the first outlet channel and the second outlet channel. Accordingly, the specific configuration of the device may be determined by the type and major dimensions of the specific particulates that are to be separated out from the fluid being processed.

For example, in embodiments where the particulates to be removed are algal cells, the desired predetermined threshold value may be approximately 1 μm to ensure that all algal cells are above the threshold value (typical algal cells are between 2 and 25 μm in length).

Again, in embodiments where blood cells are to be separated from whole blood to leave a blood plasma fraction and a concentrated blood cell sample, the desired threshold value may be approximately 1 μm to ensure that platelets, red blood cells, white blood cells etc are above the threshold value and effectively filtered.

Accordingly, the predetermined threshold value may be from 0.01 μm to 500 μm. The predetermined threshold value may be from 0.01 μm to 250 μm. The predetermined threshold may be from 0.01 μm to 100 μm. The predetermined threshold value may be 0.01 μm to 50 μm. The predetermined threshold value may be 0.01 μm to 10 μm. The predetermined threshold value may be from 0.1 μm to 10 μm. The predetermined threshold value may be 0.01 μm, 0.05 μm, 0.1 μm, 0.5 μm, 1 μm, 2 μm, 3 μm, 4 μm, 5 μm, 6 μm, 7 μm, 8 μm, 9 μm or 10 μm or greater.

Typically, the width or aspect ratio of second outlet channel is at least 3 times the width or aspect ratio of the first outlet channel, at least 4 times, at least 5 times, or at least 10 times.

Without wishing to be bound by theory, it is suggested that the provision of a device where the cross-section of the first outlet channel is significantly smaller than the cross-section of the second outlet channel means that there is a greater resistance to flow into the first outlet channel than into the second outlet channel. As a result, the majority of fluid flowing through the device will flow into the second outlet channel.

For the avoidance of doubt, as used herein the term "aspect ratio" refers to the width of a channel at a given point divided by the depth of that channel at that point (w/d). Therefore, where the depth is constant, an increase in the width of a channel results in an increase in the aspect ratio of that channel.

The second outlet channel may comprise a bend or curved portion. The bend or curved portion may be bent or curved by an angle of 40-70 degrees.

In some embodiments, the depth of the channels of the device are the same or substantially the same. Alternatively, the depth of one or more of the channels of the device may have a different depth to the other channels of the device.

In some embodiments, the depth of the channels of the device may be from 20 μm to 3000 μm. The depth of the channels of the device may be from 20 μm to 1000 μm. The depth of the channels of the device may be from 20 μm to 500 μm. The depth of the channel may be from 20 μm to 100 μm. The depth of the channels may be from 30 μm to 80 μm. For example, the depth of the channels may be 30 μm, 40 μm, 50 μm, 60 μm, 70 μm, or 80 μm.

In some embodiments, the depth of the channels of the device may be from 500 μm to 3000 μm, from 1000 μm to 3000 μm or from 2000 μm to 3000 μm.

The aspect ratio of the inlet channel may be 10, 11, 12, 13, 14, 15, 16, 17, 18, 19, 20 or greater. The aspect ratio of the inlet channel may be 13, 14, 15, 16, 17 or 18. The aspect ratio of the inlet channel may be 14, 15 or 16. For example, the aspect ratio of the inlet channel may be approximately 15 or from 15 to 16.

The aspect ratio of the curved channel may be 5, 6, 7, 8, 9, 10 or greater. The aspect ratio of the curved channel may be 7, 8, 9, or 10. The aspect ratio of the curved channel may be from 8 to 9.

The angle of curvature of the curved channel refers to how far the curved channel extends around a fixed point. For example, if the curved channel has an angle of curvature that is 180°, the curved channel describes a half circle.

The initial aspect ratio of the first outlet channel may be 1.5, 1.75, 2, 2.5, 3, 4, 5 or 6. The initial aspect ratio of the first outlet channel may be 3, 4, 5 or 6. For example, the initial aspect ratio of the first outlet channel may be 4.

The aspect ratio of the second outlet channel may be 15, 16, 17, 18, 19, 20, 21, 22, 23, 24, or 25. The aspect ratio of the second outlet channel may be 18, 19, 20, 21, or 22. For example, the aspect ratio of the second outlet channel may be 20.

The separation chamber may be at the junction between the curved channel, the first outlet channel and the second outlet channel. Accordingly, it is in the separation channel where a stream of fluid comprising particulates is directed to the second outlet channel and a stream of fluid free of the particulates is directed to the first outlet channel.

Without wishing to be bound by theory, the inlet channel and curved channel produce a fluid flow where the particulates to be separated from the fluid are concentrated in that part of the fluid adjacent to the outer wall of the curved channel. As this fluid flow enters the separation chamber from the curved channel, a vortex forms between the first outlet channel and the second outlet channel. Fluid that was adjacent to the curved channel outerwall is directed past the vortex to the second outlet channel. Fluid that was adjacent to the curved channel inner wall is directed past the vortex to the first outlet channel. Accordingly, a clean fraction of the fluid is directed into the first outlet channel, and thereby into the first outlet.

For the avoidance of doubt, the term "serpentine" used herein refers to a shape of channel that curves in alternating directions, much like a sine wave, where each curve has a common radius of curvature.

Typically, the serpentine portion of the first outlet channel comprises a plurality of curves or arcs. Each arc of the serpentine portion of the first outlet channel may have a radius of curvature of from 1 mm to 5 mm. For example, each arc of the serpentine portion of the first outlet channel may have a radius of curvature of 1 mm, 1.5 mm, 2 mm, 2.5 mm, 3 mm, 3.5 mm, 4 mm, 4.5 mm or 5 mm.

The inlet may be connected to a reservoir.

In a second aspect there is provided a microfluidic device for separating particulates that have a major dimension above a predetermined threshold value from a fluid, the device comprising a plurality of layers, each layer within the plurality of layers comprising an inlet, an inlet channel, a curved channel, a separation chamber, a first outlet and a second outlet; the inlet is connected to the inlet channel, the inlet channel is connected to the curved channel, the curved channel is connected to the separation chamber and the separation chamber is connected to the first outlet by a first outlet channel, and the separation chamber is connected to the second outlet by a second outlet channel; the first outlet channel comprises a serpentine portion; wherein the second outlet channel branches from the separation chamber substantially perpendicular to the first outlet channel; the curved channel having an angle of curvature of 150 to 270 degrees; wherein the aspect ratio of the inlet channel is from 10 to 20, the aspect ratio of the curved channel is from 5 to 10, the aspect ratio of first outlet channel is from 1.5 to 6, and the aspect ratio of the second outlet channel is from 15 to 25; the inlet of each layer within the plurality of layers is in fluid communication with a common inlet manifold, the first outlet of each layer within the plurality of layers being in fluid communication with a common first outlet manifold, and the second the inlet of each layer within the plurality of layers being in fluid communication with a common second outlet manifold; such that, during use, fluid flows from the common inlet manifold to the common first outlet manifold and the common second outlet manifold via the inlet, inlet channel, the curved channel, the separation chamber and the first outlet channel and the second outlet channel of each layer within the plurality of layers; wherein for each layer within the plurality of layers particulates within the fluid at the inlet that have a major dimension above the predetermined threshold value are substantially focused into the second outlet and the fluid that is collected at the first outlet is substantially free of particulates that have a major dimension above the predetermined threshold value.

Each layer of the plurality of layers may correspond to the device of the first aspect. Accordingly, each layer within the plurality of layers may have one or more of the characteristics as described for the device of the first aspect.

Preferably, the width of the first outlet channel varies from separation chamber to the first outlet. The first outlet channel may comprise a flared portion such that the width of the first outlet channel increases from the junction at which the first outlet channel branches from the separation chamber to the end of the flared portion. The first outlet channel may comprise a tapered portion such that the width of the first outlet channel decreases from the junction at which the first outlet channel branches from the separation chamber to the end of the tapered portion.

The flared portion or tapered portion may extend part way along the first outlet channel such that the width of the remainder of the first outlet channel is constant. For example, the flared portion or tapered portion may be 5% of the length of the first outlet channel, 10% of the length of the first outlet channel, 15% of the length of the first outlet channel or 20% of the length of the first outlet channel.

The first outlet channel may comprise a first portion within which the channel has a first width, a second portion that corresponds to a flared or tapered portion, and a third portion within which the channel has a second width.

In embodiments where the comprising a flared portion, the flared portion increases width of channel by from 1.5 times to 3 times.

Preferably, the flared portion or tapered portion corresponds to a portion of the serpentine portion of the first outlet channel.

Without wishing to be bound by theory, the main area where the aspect ratio of the channels of the device impacts the performance of the separation mechanism of the device has been found by the inventors to be at the point at which the first outlet channel and the second outlet channel branch from the separation chamber. It has been shown (Tripathi, S et al. Microdevice for plasma separation from whole human blood using bio-physical and geometrical effects. Sci. Rep. 6, 26749, 2016) that this is the area where vortex formation occurs and it is considered that for a given flow velocity, crucial to the performance of the other fluidic effects such as secondary flow (also known as Dean Flow), straight channel inertial focusing and pinched flow fractionation, the vortex will maintain an approximately steady area of effect. After the flow passes this junction or branching point, the channel aspect ratio does not impact performance as separation has already occurred and it is possible to adjust the width of the first and/or second outlet channels.

The optimum flow velocity may depend upon the depth of the channels of the device.

The effect of being able to taper or flare the width of the first outlet channel is to allow a change in the length of first outlet channel between the separation chamber and the first outlet without adversely affecting the performance of the device, thereby allowing the distance between the first outlet and the second outlet to be varied. If the length of the first outlet channel is increased without flaring the width of the channel, the flow resistance of the first outlet channel will increase leading to a reduction in flow rate through the first outlet channel for a given flow rate at the inlet of the device.

For example, if the first outlet channel flares in width by 2 times (i.e. the channel doubles in width from the junction of the first outlet channel to a distance away from that junction), the first outlet channel may be doubled in length without adversely affecting the flow rate of the device and the separation efficacy of the device.

For devices using a plurality of layers, such as devices according to the present aspect, there is a need to be able to pool or collect separately the fluid directed to each of the first and second outlets. Typically, manifolds are used to collect the fluid from a given outlet and to direct it to a separate reservoir. However, such manifolds are typically bulky and take up a large amount of physical space. For known devices, such as that described in Tripathi referenced above, for example, the first and second outlets are close together and there is not sufficient physical space to accommodate both a first outlet manifold and a second outlet manifold.

However, the inventors have surprisingly found that the provision of a flared portion to the first outlet channel allows the first outlet to be spaced sufficiently distant from the second outlet such that a common first outlet manifold and a common second outlet manifold can be mounted to the device.

The common inlet manifold may be configured to ensure that the flow rate of fluid passing through the channel of each layer within the plurality of layers is substantially the same.

The common first outlet manifold may be configured to ensure that the flow rate of fluid passing through the channel of each layer within the plurality of layers is substantially the same.

The common second outlet manifold may be configured to ensure that the flow rate of fluid passing through the channel of each layer within the plurality of layers is substantially the same.

Preferably, the common inlet manifold, the common first outlet manifold and the common second outlet manifold may be configured to ensure that the flow rate of fluid passing through the channel of each layer within the plurality of layers is substantially the same.

The common inlet manifold may comprise an inlet, a branched portion, an open portion and a manifold outlet. The manifold outlet may be in direct fluid communication with the inlet of each layer within the plurality of layers, such that fluid may flow from the single inlet of the common manifold to the inlet of each layer within the plurality of layers via the branched portion, the open portion and the manifold outlet of the common manifold.

The manifold outlet may be elongate.

The open portion is typically downstream of the branched portion.

The inlet of the common inlet manifold may be connected to a reservoir.

The common first outlet manifold may comprise an inlet, an open portion, a branched portion and a manifold outlet. The inlet may be in direct fluid communication with the first outlet of each layer within the plurality of layers, such that fluid may flow from each first outlet to a first outlet reservoir via the inlet, open portion, the branched portion and the manifold outlet of the common first outlet manifold.

The manifold inlet may be elongate.

The open portion is typically upstream of the branched portion.

The outlet of the common first outlet manifold may be connected to a reservoir.

The common second outlet manifold may comprise an inlet, an open portion, a branched portion and a manifold outlet. The inlet may be in direct fluid communication with the second outlet of each layer within the plurality of layers, such that fluid may flow from each second outlet to a second outlet reservoir via the inlet, open portion, the branched portion and the manifold outlet of the common second outlet manifold.

The manifold inlet may be elongate.

The open portion is typically upstream of the branched portion.

The outlet of the common second outlet manifold may be connected to a reservoir.

The provision of a common inlet manifold and/or a common first outlet manifold and/or a common second outlet manifold to provide fluid at a common flow rate to the inlet of each layer of the device ensures that each layer of the device will process the fluid in the same way i.e. the first outlet of each layer will comprise the same target population of particles or be free of the same target population of particles. Accordingly, the plurality of layers of the device of the present invention process fluid in parallel, thereby allowing a large volume of fluid to be processed by the device at once, even though the volume that may be processed by each channel may be small. In embodiments where the plurality of layers comprises 20 layers, the device may be configured to process 1 L/min, but each layer may only be capable of processing 2-150 mL/min. For example, in embodiments where the plurality of layers comprises 750 layers, the device may be configured to process 4.5 L/min with an individual layer processing 6 mL/min.

Furthermore, the provision of a common inlet manifold allows the fluid to be processed by the device to be introduced into the device by a single input (the input of the common manifold) and therefore, only requires the provision of a single pressure source, such as a single pump, and a single set of fittings to be used, for example. Using a single pump, or other single pressure source, allows the flow rate through the inlets, and therefore the channels, of each layer within the plurality of layers to be much more readily controlled and balanced to ensure that the flow rate through each channel is substantially the same. Furthermore, a device requiring only a single set of fittings and a single pressure source will typically reduce the space required to connect the channels of the device to the pressure source. Accordingly, the device of the invention is a simple solution for processing of fluids, and is more cost efficient and space efficient than devices known in the art.

Typically, the common inlet manifold is connected to the plurality of layers of the device via a sealing means. The sealing means may be located between the device and the common inlet manifold. The sealing means may provide a fluid-tight seal to ensure that fluid from the common inlet manifold flows into the inlet of each layer within the plurality of layers of the device without leaking out at the interface between the common inlet manifold and the device. Typically, the sealing means is formed from an elastic material that may be deformed by urging the common inlet manifold towards the contact point between the common inlet manifold and the device. For example, the sealing means may be a gasket that is formed of rubber or similar.

Similarly, the common first outlet manifold and the common second outlet manifold may be connected to the plurality of layers of the device via sealing means.

According to a third aspect there is provided a method of use of a device according to the second aspect, the method comprising the steps:

a providing a fluid comprising a target population of particles;

b driving the fluid into the single inlet of the common inlet manifold of the device at a first rate of flow; and c collecting the fluid from the first and second outlets of each layer within the plurality of layers, wherein the fluid from the second outlet of each layer comprises the target population of particles, and fluid from the first outlet is substantially devoid of the target population of particles.

Preferably, the fluid from the second outlet comprises the majority of the target population of particles. Preferably, the fluid from the second outlet comprises substantially all of the target population of particles.

The provision of a device comprising a plurality of layers, the inlet of each layer within the plurality of layers being in fluid communication with a single pressure source, such as a pump, via a common manifold, reduces the machinery required to process large volumes of fluid, requiring only a single pump to provide fluid to each inlet, and greatly simplifying the equalising or balancing of pressure across all of the inlets for each layer within the plurality of layers of the device. Accordingly, each layer within the plurality of layers processes the fluid passing through it in substantially the same way as every other layer within the plurality of layers.

In a fourth aspect there is provided a system for removing populations of particles from a fluid comprising a plurality of devices according to the first aspect or second aspect, the first outlet of a first device is in fluid communication with the inlet of a subsequent second device, wherein the channels of the first device are dimensioned to focus particles of a first range of diameters into the second outlet of the first device, and the channels of the second device are dimensioned to focus particles of a second range of diameters into the second outlet of the second device, such that fluid comprising populations of particles with diameters within the first and/or second range of diameters may be sequentially removed from the fluid as the fluid passes through the plurality of devices.

Preferably, in embodiments using devices according to the second aspect, fluid is processed by each device in the system using the method of the third aspect.

Preferably, the diameter or range of diameters of the target populations removed by each subsequent device within the system may be smaller than the previous device, such that each subsequent device removes smaller particles than the previous device in the system.

The resulting fluid produced by the system may be substantially free of particles, or substantially free of the target populations of particles.

The second outlet of each layer of each device in the system of the present invention may be in fluid communication within the inlet of the common manifold of that device, such that fluid comprising the target population of particles is further processed by that device to reduce the volume of fluid comprising the target population of particles, thereby concentrating the target population of particles. Concentrating a dilute population of particles, may allow that population of particles to be more readily detected, for example. Furthermore, reprocessing fluid comprising the target population of particles may allow a greater volume of fluid that is devoid of the target population of particles to be obtained, effectively providing the function of filtering the fluid of the target population of particles.

Typically, the common manifold of each device within the plurality of devices may be in fluid communication with a reservoir for that device. The second outlet of the device may feed into the reservoir for that device such that the fluid is re-circulated through the device.

Accordingly, the system may comprise a plurality of reservoirs, each reservoir associated with a device within the plurality of devices.

Preferably, the fluid is an aqueous liquid. For example, the fluid may be water that may be contaminated with a particles of a variety of diameters. Alternatively, the fluid may be a bodily fluid. For example, the fluid may be blood, wound fluid, plasma, serum, urine, stool, saliva, cord blood, chorionic villus samples, amniotic fluid, transcervical lavage fluid, or any combination thereof.

Fluid that has been processed by the system of the present aspect may be ready to test for particles having a target diameter. For example, water that has been processed using the system of the present aspect may be suitable for testing for the presence of water borne pathogens such as *Cryptosporidium* or Giardia, without requiring conventional filtration of larger particles that may otherwise be present. Alternatively, different target populations of particles may be concentrated by each device within the plurality of devices of the system of the present aspect, thereby allowing a plurality of target dilute species within a bulk fluid to be concentrated down into a smaller volume of fluid that may be more suitable for testing for that target species, for example. Accordingly, multiple target species can be concentrated up for detection by the system as the fluid is processed.

Populations of particles of a given target diameter may be concentrated by one of the devices within the system of the present aspect, and the produced concentrated population of particles of the target diameter may be sufficiently concentrated to be detected. In embodiments where the particles of a target diameter are concentrated after particles having a diameter that is larger than the target diameter have been concentrated in prior devices within the system, the particles of the target diameter may be concentrated without the presence of those larger particles.

The system may comprise a plurality of devices according to the second aspect connected in parallel by a further common manifold. The further common manifold may be in fluid communication with the inlet of each common manifold of each device within the plurality of devices such that fluid may flow from the further common manifold through each common manifold of each device within the plurality of devices via the inputs of each respective common manifold to the first and second outlets of each layer of each device within the plurality of devices. The further common manifold may be configured to ensure that the flow rate of fluid passing through the inlet of each common manifold of each device within the plurality of devices is substantially the same.

Accordingly, the use of a plurality of devices connected by a further common manifold may allow a much larger volume of fluid to be processed in a uniform manner. I.e., the flow rate of fluid passing through each layer of each device is substantially the same such that substantially the same target population of particles are focused by each layer of each device in the plurality of devices.

Furthermore, fluid processed by the plurality of devices may be driven by a single pump, thereby saving costs and ensuring uniformity of pumping across the plurality of devices.

The plurality of devices may comprise at least 20 devices, at least 30 devices, at least 50 devices, at least 100 devices, at least 200 devices, at least 500 devices or at least 1000 devices. The plurality of devices may comprise from two to 500 devices. The plurality of devices may comprise from two to 200 devices. The plurality of devices may comprise from two to ten devices. For example, the plurality of devices may comprise two, five, seven, ten, fifteen, twenty, twenty five or thirty devices.

BRIEF DESCRIPTION OF THE FIGURES

Embodiments of the present invention will now be described, by way of non-limiting example, with reference to the accompanying drawings.

DETAILED DESCRIPTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

In order to demonstrate the efficacy of the device, the following experiments were carried out.

Example 1—Single Flow Channel

Test samples were used containing a variety of algal species to determine the percentage of biomass that could be removed from the sample. This experiment was called a "dewatering" experiment.

Figure 1:
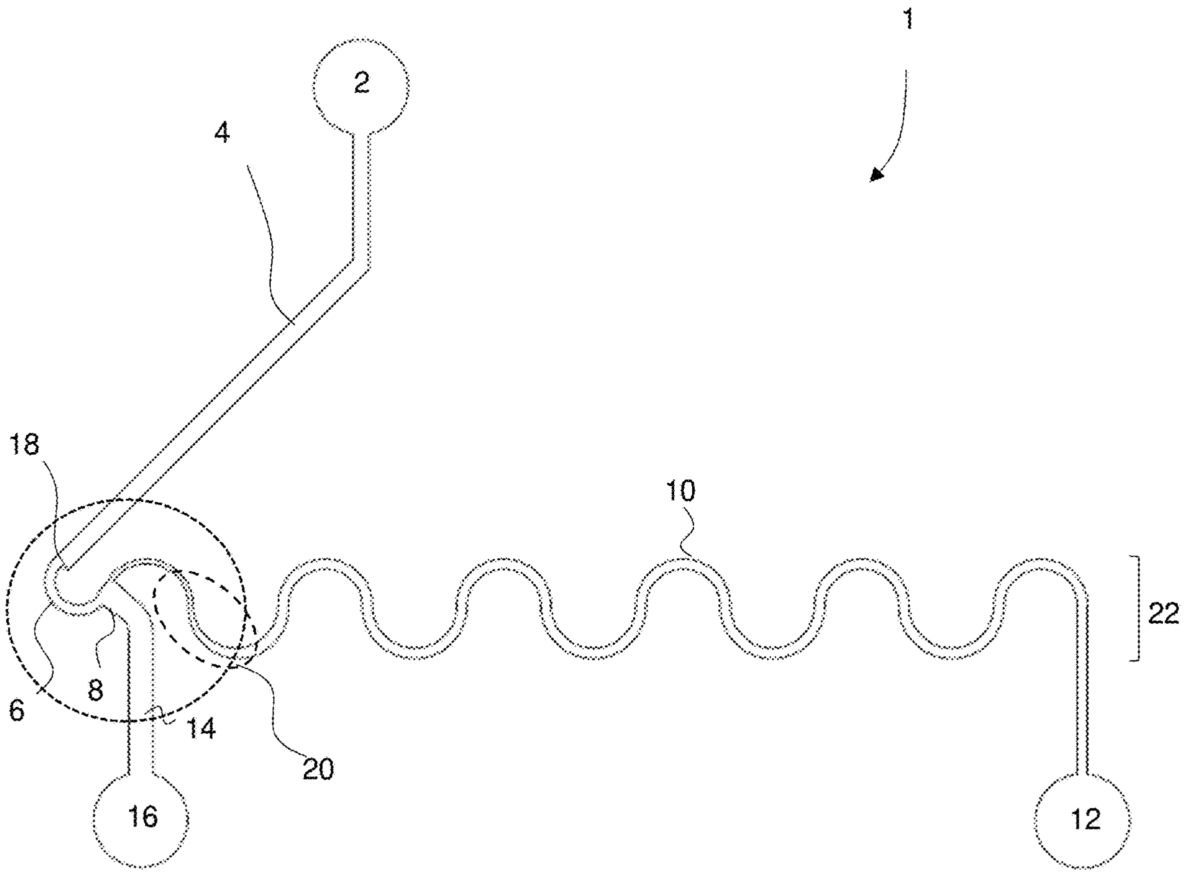
FIG. 1: A microfluidic device according to an embodiment.
Figure 2:
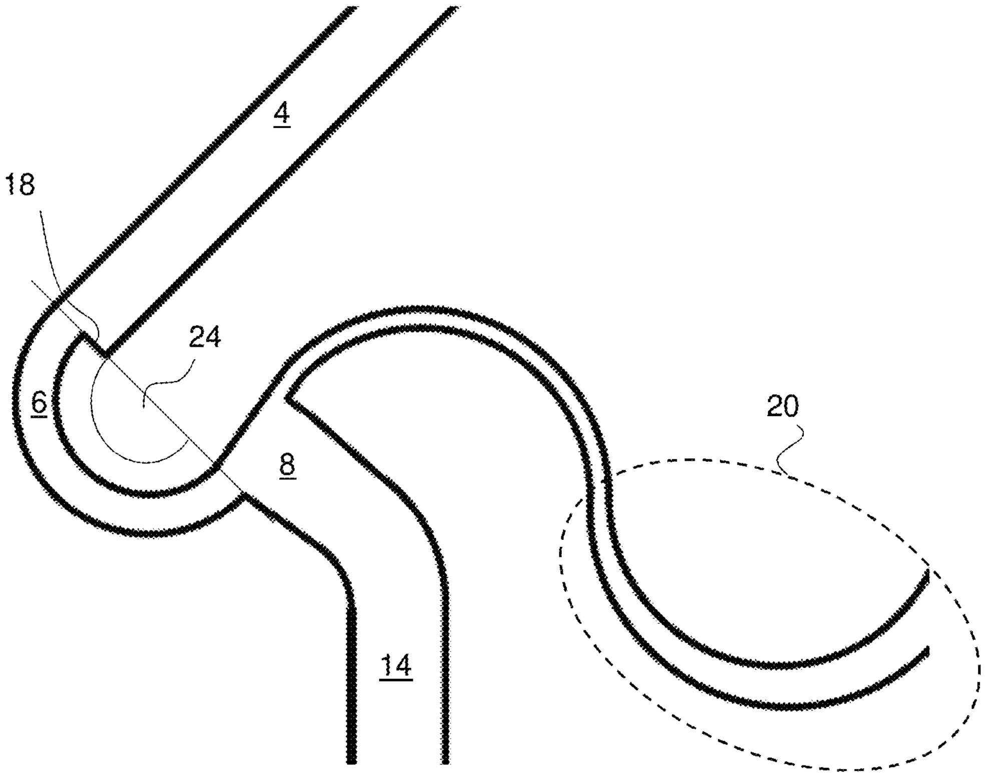
FIG. 2: A zoomed in view of the portion of a device according to an embodiment indicated by the dotted circle in FIG. 1.

A device as shown in FIG. 1 and FIG. 2 was used to process the test samples. The device 1 comprises an inlet 2, a linear inlet channel 4 (acting as an inlet channel), a curved channel 6, a separation chamber 8, a first outlet channel 10, a first outlet 12, a second outlet channel 14 and a second outlet 16.

During use, fluid flows from the inlet 2 to the first outlet 12 via the inlet channel 4, the curved channel 6, the separation chamber 8, and the first outlet channel 10 or to the second outlet 16 via the inlet channel 4, the curved channel 6, the separation chamber 8, and the second outlet channel 14.

All channels have a depth of 60 μm.

The inlet channel 4 has a width of 0.92 mm and an aspect ratio of 15.33. The curved channel 6 has a width of 0.52 mm, an aspect ratio of 8.67 and an angle of curvature 24 of 180°. Accordingly, there is a discontinuity 18 where the inlet channel 4 and the curved channel 6 connect.

The first outlet channel 10 has an initial width of 0.24 mm (aspect ratio of 4), increasing in a flared portion 20 to a width of 0.51 mm (aspect ratio of 8.5). The second outlet channel has a width of 1.2 mm and an aspect ratio of 20.

The first outlet channel has a sinusoidal portion 22.

Fluid from each test sample was put into a reservoir at the inlet of the device. The fluid was the pumped into the inlet at a rate of 6 mL/min. The fluid was collected at the first outlet ("permeate") and at the second outlet ("retentate"). The optical density of the initial test samples, the retentate and the permeate where measured using a photo-spectrometer and the results are provided in Table 1 below.

TABLE 1

The performance of dewatering of single chip technology

| Name of species | OD initial | OD retentate | OD permeate | % of recovery |
|---|---|---|---|---|
| *Chlorella vulgaris* | 0.548 | 0.5795 | 0.045 | 92.23 |
| *Tetraselmis suecica* | 0.6705 | 0.62 | 0.077 | 87.58 |
| *Tetraselmis suecica* concentrated | 0.9005 | 0.917 | 0.092 | 89.96 |
| *Dunaliella primolecta* | 0.5155 | 0.4425 | 0.023 | 94.80 |
| *Phaedactylum tricornutum* | 1.59 | 1.665 | 0.0105 | 99.36 |
| *Spirulina maxima* | 0.734 | 0.8085 | 0.114 | 85.89 |
| *Scenedesmus quadricuada* | 1.5045 | 1.608 | 0.0035 | 99.78 |

The best results of up to 99% of biomass recovery was shown for *Phaeodactylum tricornutum* and *Scenedesmus quadricauda*, taking into account that the initial concentration of these both cultures were relatively high (OD=1.5-1.59) in Table 1. The other species dewatering was less efficient with results ranging from 85 to 95%. The less efficient dewatering was for *Spirulina maxima*, potentially because this culture has specific forms of filament formation.

In addition, it has been found that the optimum flow rate of fluid through the device is as provided in Table 2.

TABLE 2

The determined optimal flow rate for devices having a given depth of channel

| Channel Depth (μm) | Optimum Flow rate (mL/min) |
|---|---|
| 50 | 3.1 |
| 60 | 4.5 |
| 75 | 6.0 |
| 90 | 13.0 |
| 180 | 30.0 |

Optimal flow rate was determined to be the maximum flow rate of fluid through the device without a negative impact in particle separation efficacy.

Example 2—Stacked Device

Figure 3:
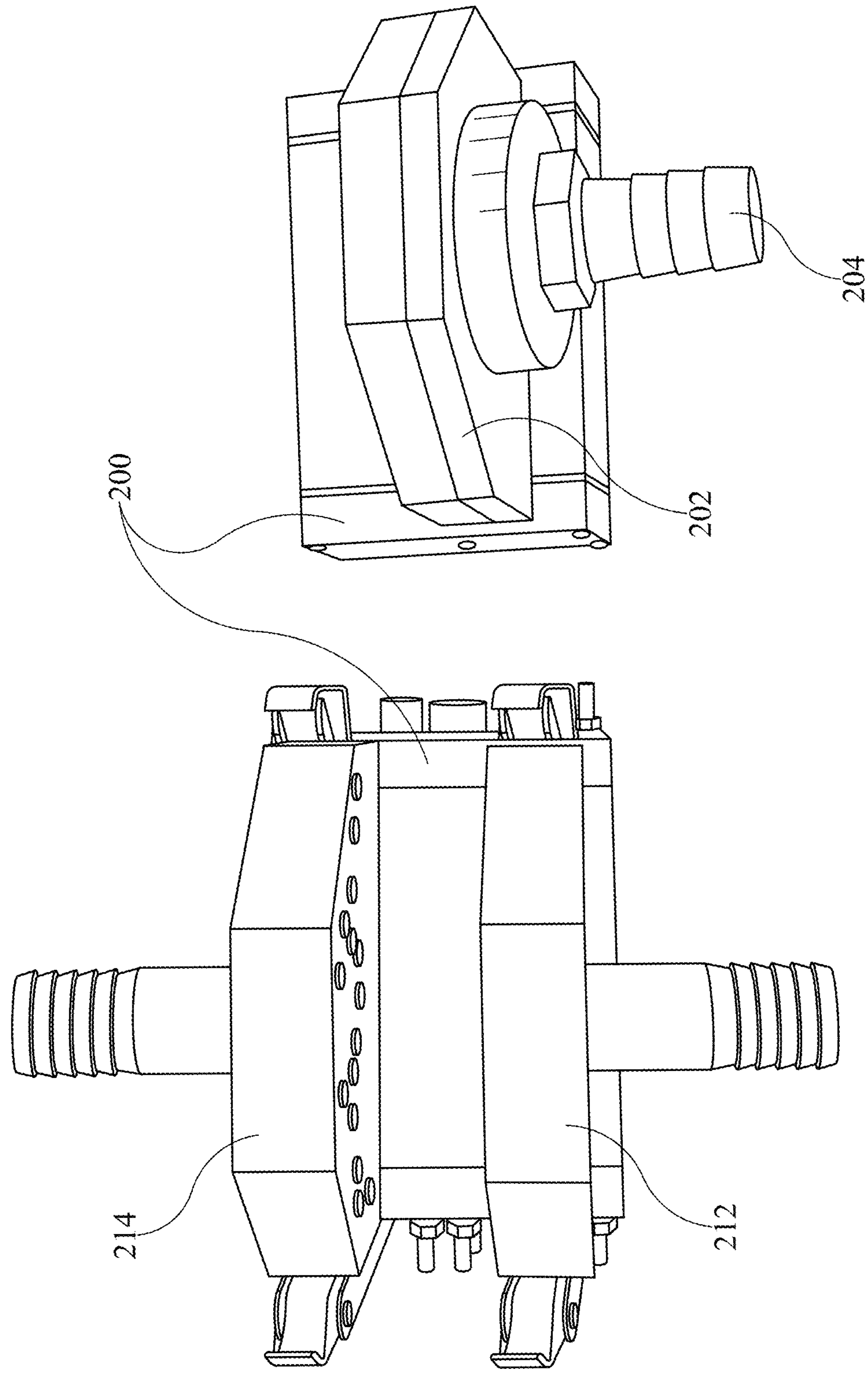
FIG. 3: A photograph of a device comprising a stack of microchannels according to an embodiment with a first and second manifold coupled to the first and second outlets of each microchannel, and an inlet manifold coupled to the inlets of each microchannel.

A stacked device 200 (for example, see FIG. 3) having 750 microchannels operating in parallel was tested to demonstrate that a high volume of fluid can be processed without losing separation efficacy.

Each microchannel of the stacked device corresponded to a device as described in the first example. The inlet of each microchannel (acting as a layer) was coupled to an inlet manifold 202 (acting as a common inlet manifold). The inlet manifold 202 (see FIG. 4) comprising an inlet 204, a branched portion 206, an open portion 208 and a manifold outlet 210.

Figure 4:
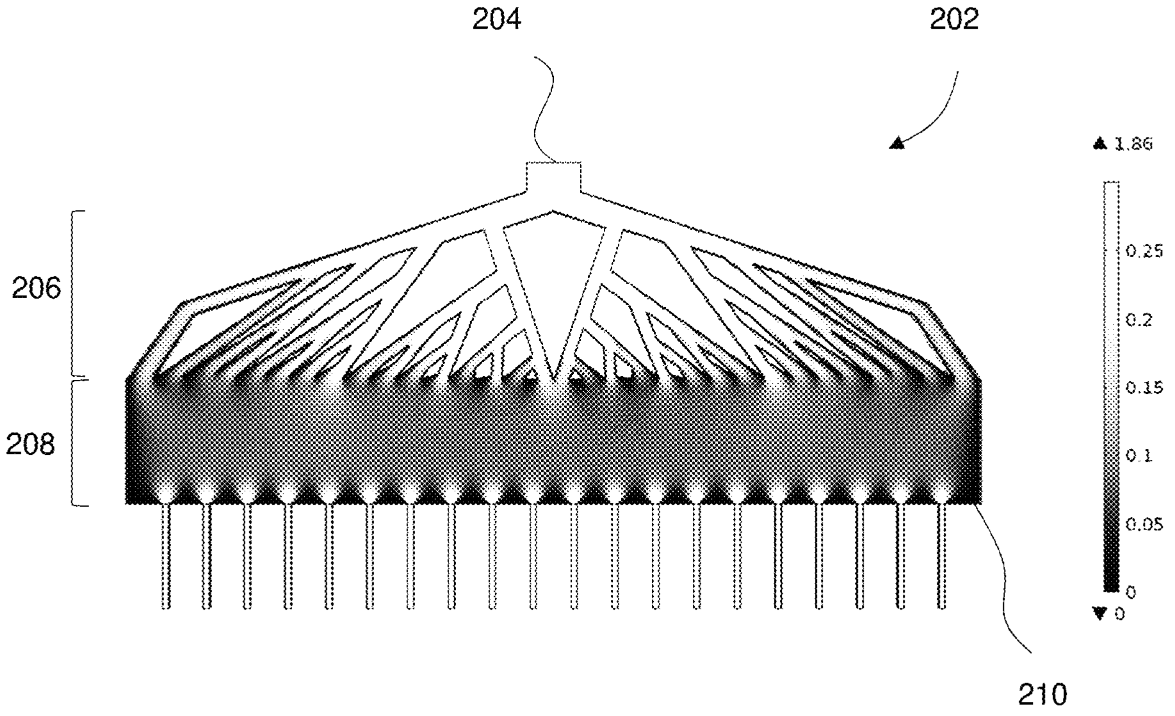
FIG. 4: An example common inlet manifold that may be used with the device comprising a stack of microchannels showing the flow rate through the common inlet manifold.

The first outlet of each microchannel was coupled to a first outlet manifold 212 (acting as a common first outlet manifold). The second outlet of each microchannel was coupled to a second outlet manifold 214 (acting as a common second outlet manifold). Each of the first outlet manifold and second outlet manifold had a structure similar to that of the inlet manifold as shown in FIG. 4.

Figure 5:
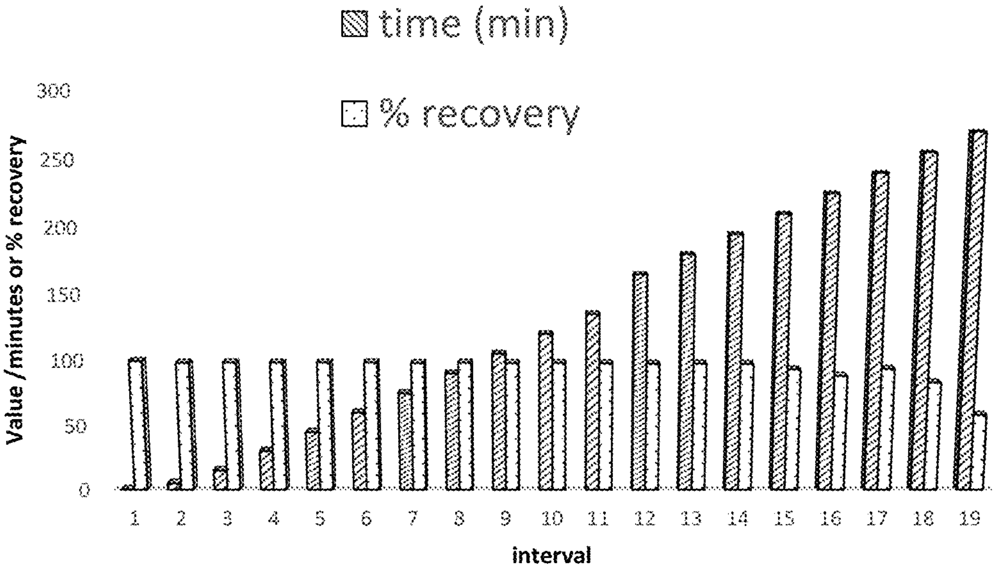
FIG. 5: Chart showing efficacy of a stack of 750 devices according to an embodiment to filter *Scenedesmus quadricyada* from a sample of a period of time, where the dotted chart shows % recovery and the dashed chart shows the time of operation for that recovery in 15 minute intervals.

A test sample containing *Scenedesmus quadricuada* was pumped into the inlet of the inlet manifold and thereby processed by the device. Particulate contents of the fluid collected by the first outlet manifold and the second outlet manifold was determined by optical density measurements. The separation efficiency of the stacked device 200 is shown in FIG. 5, demonstrating that good separation performance was maintained for at least 4 hours.

Power consumption was monitored and results indicate an energy requirement of ~1.25 $kWh/m^3$ of sample processed. Alternative methods of particle separation from a fluid, such as membrane filtration have an energy consumption of 2.23 $kWh/m^3$ (Gerardo et al., Journal of Membrane Science 464:86-99, 2014), and centrifugation has an energy consumption typically in the region of 8 $kWh/m^3$. Accordingly, the stacked device is more energy efficient that alternative devices used for particulate separation.

This energy efficiency is enabled by increasing the cross-sectional area in dimensions of the device that have been shown to be non-critical. This has the effect of increasing the aspect ratio, which had previously been considered to be damaging to performance. However, it has been shown that the present device is able to successfully separate out particles of a desired dimension from a fluid whilst increasing the aspect ratio of at least some channels to thereby increase the volume of fluid that can be processed in a given time.

Furthermore, the ability to vary the distance between the first outlet and the second outlet by providing a first outlet channel having a flared portion allows the first and second outlets to be sufficiently separated to spatially allow manifolds to be positioned such that fluid from the first and second outlets of each microchannel in the stacked device can be collected, thereby allowing a plurality of microchannels to process a fluid in parallel, thereby significantly improving the efficiency of the device and allowing a much higher volume of fluid to be processed in a compact device.

What is claimed is:

1. A microfluidic device for separating particulates that have a major dimension above a predetermined threshold value from a fluid, the device comprising:

an inlet, an inlet channel, a curved channel, a separation chamber, a first outlet and a second outlet;

the inlet being connected to the inlet channel, the inlet channel is connected to the curved channel, the curved channel is connected to the separation chamber and the separation chamber is connected to the first outlet by a first outlet channel, and the separation chamber is connected to the second outlet by a second outlet channel;

the first outlet channel comprises a sinusoidal/serpentine portion;

wherein the second outlet channel branches from the separation chamber substantially perpendicular to the first outlet channel;

the curved channel having an angle of curvature of 150 to 270 degrees;

wherein an aspect ratio (width/depth ratio) of the inlet channel is from 10 to 20, an aspect ratio of the curved channel is from 5 to 10, an aspect ratio of the first outlet channel adjacent to the separation chamber is from 1.5 to 6, and an aspect ratio of the second outlet channel adjacent to the separation chamber is from 15 to 25 such that, during use, fluid flows from the inlet, to the first outlet and the second outlet via the inlet channel, the curved channel, the separation chamber and the first outlet channel and the second outlet channel respectively;

wherein particulates within the fluid at the inlet that have the major dimension above the predetermined threshold value are substantially focused into the second outlet and the fluid that is collected at the first outlet is substantially free of particulates that have the major dimension above the predetermined threshold value.

2. The device of claim 1, wherein a width of the inlet channel is from 1.5 to 3 times greater than a width of the curved channel.

3. The device of claim 1, wherein the predetermined threshold value is from 0.01 μm to 500 μm.

4. The device of claim 1, wherein a width or aspect ratio of second outlet channel is at least 3 times a width or aspect ratio of the first outlet channel.

5. The device of claim 1, wherein the second outlet channel comprises a bend or curved portion.

6. The device of claim 1, wherein a depth of all of the channels of the device are the same or substantially the same.

7. The device of claim 6, wherein a depth of all of the channels of the device are from 20 μm to 3000 μm.

8. A system for removing populations of particles from a fluid comprising a plurality of devices according to claim 1, the first outlet of a first device is in fluid communication with an inlet of a subsequent second device, wherein the channels of the first device are dimensioned to focus particles of a first range of diameters into a second outlet of the first device, and all of the channels of the second device are dimensioned to focus particles of a second range of diameters into a second outlet of the second device, such that fluid comprising populations of particles with diameters within the first and/or second range of diameters may be sequentially removed from the fluid as the fluid passes through the plurality of devices.

9. A microfluidic device for separating particulates that have a major dimension above a predetermined threshold value from a fluid, the device comprising:

a plurality of layers, each layer of the plurality of layers comprising an inlet, an inlet channel, a curved channel, a separation chamber, a first outlet and a second outlet;

the inlet is connected to the inlet channel, the inlet channel is connected to the curved channel, the curved channel is connected to the separation chamber and the separation chamber is connected to the first outlet by a first outlet channel, and the separation chamber is connected to the second outlet by a second outlet channel;

the first outlet channel comprises a sinusoidal/serpentine portion;

wherein the second outlet channel branches from the separation chamber substantially perpendicular to the first outlet channel;

the curved channel having an angle of curvature of 150 to 270 degrees;

wherein an aspect ratio of the inlet channel is from 10 to 20, an aspect ratio of the curved channel is from 5 to 10, and an aspect ratio of first outlet channel is from 1.5 to 6;

the inlet of each layer of the plurality of layers is in fluid communication with a common inlet manifold, the first outlet of each layer of the plurality of layers being in fluid communication with a common first outlet manifold, and the second outlet of each layer of the plurality of layers being in fluid communication with a common second outlet manifold; such that, during use, fluid flows from the common inlet manifold to the common first outlet manifold and the common second outlet manifold via the inlet, inlet channel, the curved channel, the separation chamber and the first outlet channel and the second outlet channel of each layer of the plurality of layers;

wherein for each layer of the plurality of layers particulates within the fluid at the inlet that have the major dimension above the predetermined threshold value are substantially focused into the second outlet and the fluid that is collected at the first outlet is substantially free of particulates that have the major dimension above the predetermined threshold value.

10. The device of claim 9, wherein a width of the first outlet channel varies from the separation chamber to the first outlet.

11. The device of claim 10, wherein the first outlet channel comprises a flared portion and a width of the flared portion increases from the separation chamber to an end of the flared portion closest to the first outlet.

12. The device of claim 11, wherein the flared portion extends part of the way along the first outlet channel such that a width of the remainder of the first outlet channel is constant.

13. The device of claim 11, wherein the flared portion corresponds to a portion of the serpentine portion of the first outlet channel.

14. A method of use of a device according to claim 9, the method comprising the steps:

providing the fluid comprising a target population of particles;

driving the fluid into the inlet of the device or the inlet of the common inlet manifold of the device at a first rate of flow; and collecting the fluid from the first and second outlets of the device or each layer within the plurality of layers, wherein the fluid from the second outlet comprises the target population of particles, and fluid from the first outlet is substantially devoid of the target population of particles.

* * * * *